United States Patent
Marrs et al.

(10) Patent No.: US 6,918,704 B2
(45) Date of Patent: Jul. 19, 2005

(54) TUNABLE FIBER OPTIC CONNECTOR

(75) Inventors: Samuel M. Marrs, Bradley, IL (US); Gregory L. Kuffel, Plainfield, IL (US)

(73) Assignee: Panduit Corp., Tinley Park, IL (US)

( * ) Notice: Subject to any disclaimer, the term of this patent is extended or adjusted under 35 U.S.C. 154(b) by 137 days.

(21) Appl. No.: 10/354,273

(22) Filed: Jan. 30, 2003

(65) Prior Publication Data

US 2004/0151437 A1 Aug. 5, 2004

(51) Int. Cl.[7] .............................................. G02B 6/36
(52) U.S. Cl. ...................................... 385/78; 385/53
(58) Field of Search ...................... 385/60, 62, 76–78, 385/81, 84

(56) References Cited

U.S. PATENT DOCUMENTS

| | | |
|---|---|---|
| 4,741,590 A | 5/1988 | Caron |
| 4,753,510 A | 6/1988 | Sezerman |
| 4,844,570 A | 7/1989 | Tanabe |
| 4,889,406 A | 12/1989 | Sezerman |
| 5,212,752 A | 5/1993 | Stephenson et al. |
| 5,293,581 A | 3/1994 | DiMarco |
| 5,390,269 A | 2/1995 | Palecek et al. |
| 5,394,497 A | 2/1995 | Erdman et al. |
| 5,436,995 A | 7/1995 | Yoshizawa et al. |
| 5,481,634 A | 1/1996 | Anderson et al. |
| 5,533,157 A | 7/1996 | Coutts |
| 5,751,875 A | 5/1998 | Edwards et al. |
| 5,809,192 A | 9/1998 | Manning et al. |
| 5,883,995 A | 3/1999 | Lu |
| 6,019,521 A | 2/2000 | Manning et al. |
| 6,062,739 A | 5/2000 | Blake et al. |
| 6,102,581 A | 8/2000 | Deveau et al. |
| 6,155,146 A | 12/2000 | Andrews et al. |
| RE37,080 E | 3/2001 | Stephenson et al. |
| 6,206,581 B1 | 3/2001 | Driscoll et al. |
| 6,224,268 B1 | 5/2001 | Manning et al. |
| 6,238,101 B1 | 5/2001 | Chen et al. |
| 6,254,278 B1 | 7/2001 | Andrews et al. |
| 6,287,018 B1 | 9/2001 | Andrews et al. |
| 6,293,710 B1 | 9/2001 | Lampert et al. |
| 6,318,903 B1 | 11/2001 | Andrews et al. |
| 6,325,547 B1 | 12/2001 | Cammons et al. |
| 6,341,191 B1 | 1/2002 | Takahashi |
| 6,367,984 B1 | 4/2002 | Stephenson et al. |
| 6,428,215 B1 | 8/2002 | Nault |
| 6,629,782 B2 * | 10/2003 | McPhee et al. ............... 385/78 |
| 6,663,293 B2 | 12/2003 | Lampert et al. |
| 6,695,489 B2 * | 2/2004 | Nault .......................... 385/78 |
| 2003/0142919 A1 | 7/2003 | Zimmel |
| 2004/0052474 A1 * | 3/2004 | Lampert et al. ............... 385/78 |

FOREIGN PATENT DOCUMENTS

JP 2002-90580 3/2002

* cited by examiner

Primary Examiner—Phan T. H. Palmer
Assistant Examiner—Jennifer Doan
(74) Attorney, Agent, or Firm—Robert A. McCann; Christopher S. Clancy

(57) ABSTRACT

A tunable fiber optic connector is disclosed. The connector includes a ferrule assembly comprising a ferrule and a ferrule holder for receiving the ferrule therein. The ferrule holder has a plurality of splines on the periphery of a front surface thereof, and a spring bears against a rear surface of the ferrule holder and applies a forward biasing force to the ferrule assembly. The connector also includes a housing having a central bore extending therethrough in which the ferrule assembly is located. The housing has at least one tuning arm within the bore for engaging the ferrule assembly, and the tuning arm allows the ferrule assembly to be tuned inside the housing without disengaging the ferrule assembly from the tuning arm. A method of assembling a tunable fiber optic connector is also disclosed.

17 Claims, 5 Drawing Sheets

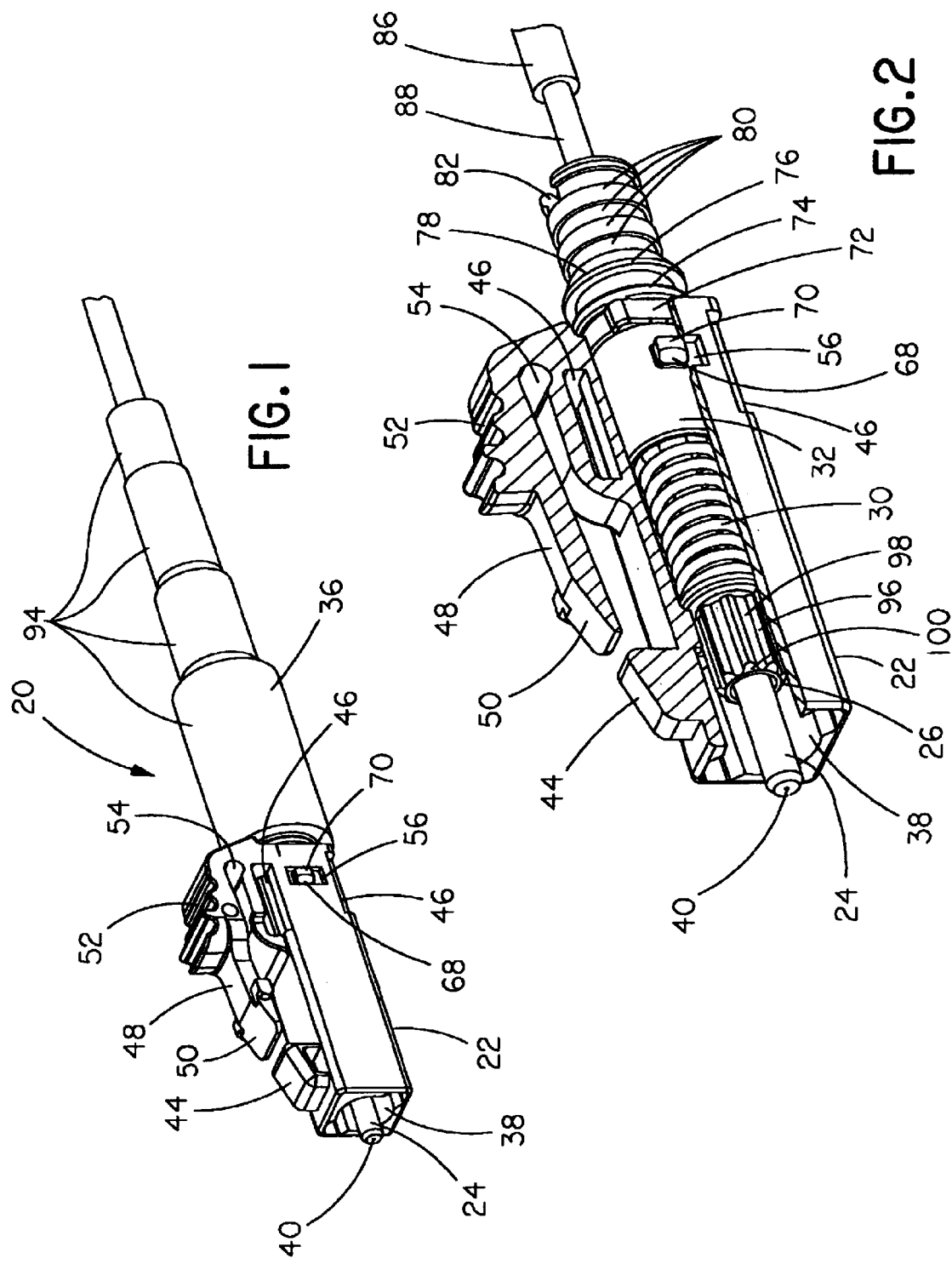

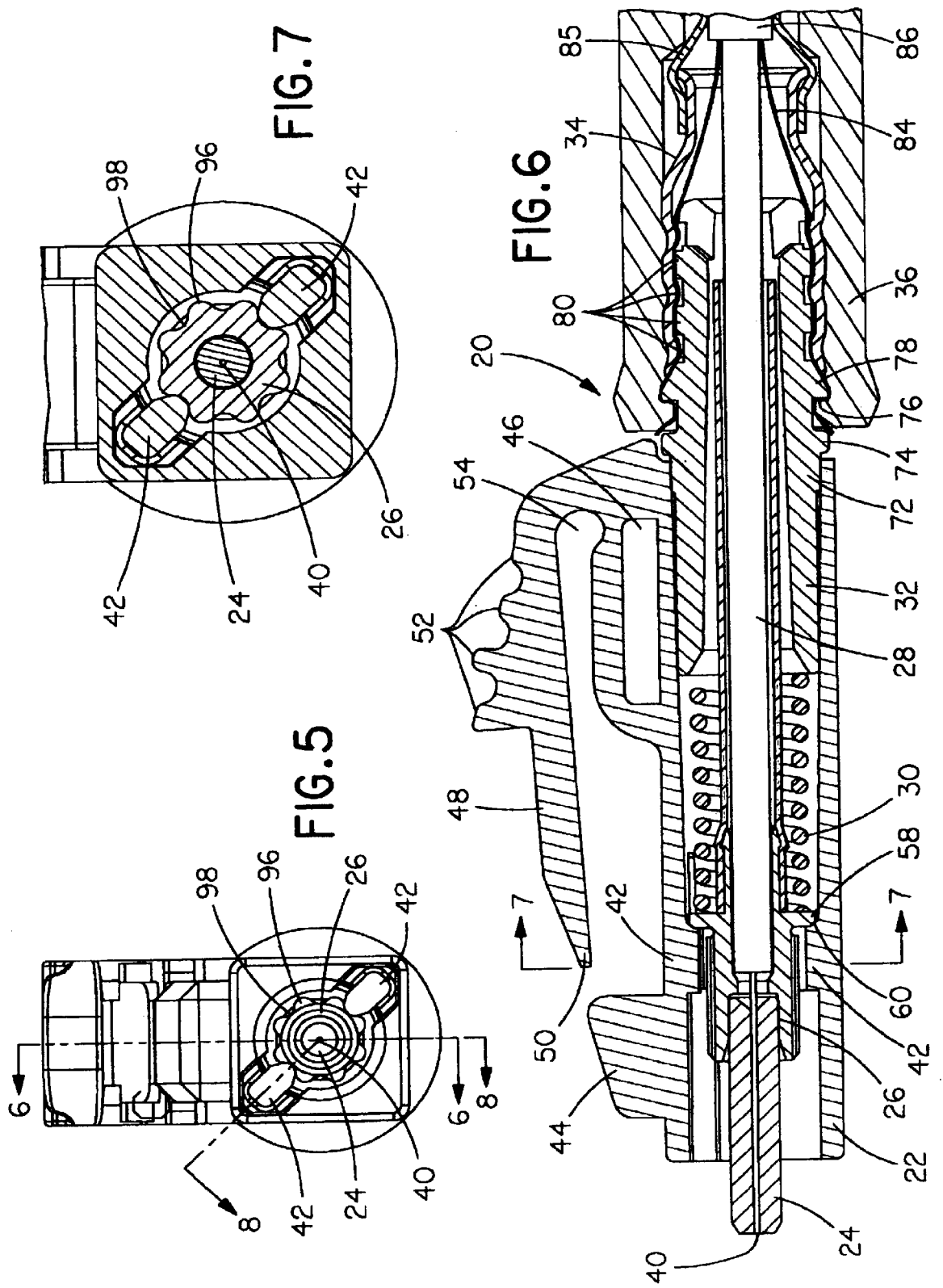

TUNABLE FIBER OPTIC CONNECTOR

CROSS-REFERENCE TO RELATED APPLICATIONS

This application is related to U.S. patent application Ser. No. 10/354,388 Ser. No. 60/443,694 and Ser. No. 60/443,742, all filed concurrently herewith.

BACKGROUND OF THE INVENTION

The present invention is directed to a fiber optic connector and, more particularly, to a tunable fiber optic connector.

Tunable fiber optic connectors are known in the telecommunications industry. One such tunable fiber optic connector is disclosed in U.S. Pat. No. 6,287,018, assigned to Lucent Technologies. The '018 patent discloses a fiber optic connector that can be tuned in the field after the connector has been fully assembled. The '018 patent teaches tuning the fiber optic connector by unseating a multi-faceted holding member and rotating it an incremental amount equal to the angle between two adjacent facets then reseating the holding member. However, none of the prior art tunable fiber optic connectors, including the one disclosed in the '018 patent, provide a fiber optic connector having the ability to tune the ferrule assembly inside the connector housing without having to disengage the ferrule assembly from the alignment system.

It would be desirable to provide a fiber optic connector having the ability to tune the ferrule assembly inside the connector housing without having to disengage the ferrule assembly from the tuning arms.

SUMMARY OF THE INVENTION

A tunable fiber optic connector is disclosed. Preferably, the connector is an LC type connector. The connector includes a ferrule assembly comprising a ferrule and a ferrule holder for receiving the ferrule therein. The ferrule holder has a plurality of splines on the periphery of a front surface thereof, and a spring bears against a rear surface of the ferrule holder and applies a forward biasing force to the ferrule assembly.

The connector also includes a housing having a central bore extending therethrough in which the ferrule assembly is located. The housing has at least one tuning arm within the bore for engaging the ferrule assembly, and the tuning arm allows the ferrule assembly to be tuned inside the housing without disengaging the ferrule assembly from the tuning arm. Preferably, the housing has two tuning arms within the bore for engaging the ferrule assembly.

Preferably, the ferrule holder has eight splines spaced 45 degrees apart around the periphery of the front surface thereof, and one of the splines engages the tuning arm during rotation of the ferrule assembly.

Preferably, the ferrule holder has eight grooves spaced 45 degrees apart around the periphery of the front surface thereof, and one of the grooves mates with the tuning arm when the ferrule assembly is in a tuned position.

Preferably, the housing has a latch including a lead-in for deflecting the latch while mating the connector into an adapter, and grips for depressing the latch and facilitating removal of the connector from the adapter.

Preferably, the housing has a latch guide for guiding a dust cap onto the housing, and the latch guide protects the lead-in while mating the connector into the adapter. Moreover, the housing has two attachment slots for allowing the connector to be duplexed, and a window for mating with a latch to lock a backbone onto the housing.

BRIEF DESCRIPTION OF FIGURES

FIG. 1 is a front perspective view of a fully assembled tunable fiber optic connector according to the present invention;

FIG. 2 is a partial cross-sectional view of the connector housing of FIG. 1;

FIG. 5 is an end view of the connector of FIG. 1;

FIG. 6 is a cross-sectional view taken along lines 6—6 of FIG. 5;

FIG. 7 is a cross-sectional view taken along lines 7—7 of FIG. 6;

DETAILED DESCRIPTION OF PREFERRED EMBODIMENTS

The illustrated embodiments of the invention are directed to a fiber optic connector having the ability to tune the ferrule assembly inside the connector housing without having to disengage the ferrule assembly from the tuning arms. FIG. 1 shows a fully assembled tunable LC type connector 20. It is likewise contemplated that the principles of this invention are also applicable to other types of connectors, such as an ST, SC, FC or FJ type connector.

Figure 3:
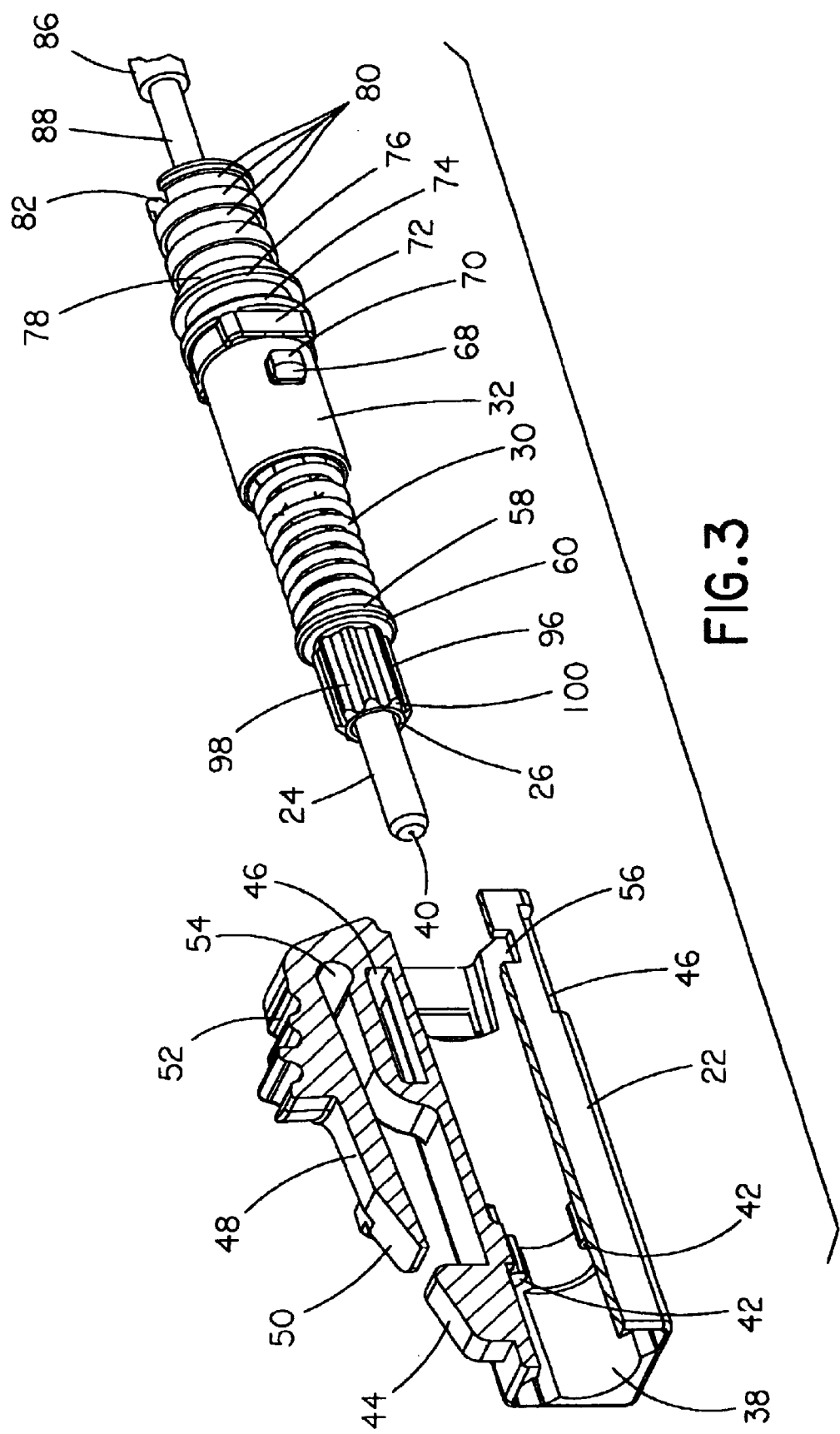
FIG. 3 is an exploded perspective view of the connector housing of FIG. 2.

As shown in FIGS. 1–4, the connector 20 includes a housing 22, a ferrule assembly comprising a ferrule 24 and a ferrule holder 26, an adhesive tube 28, a helical spring 30, a backbone 32, a crimp sleeve 34, and a boot 36. FIG. 2 shows a partial cross-sectional view of the housing 22 of FIG. 1, and FIG. 3 shows an exploded view of the housing 22.

Figure 4:
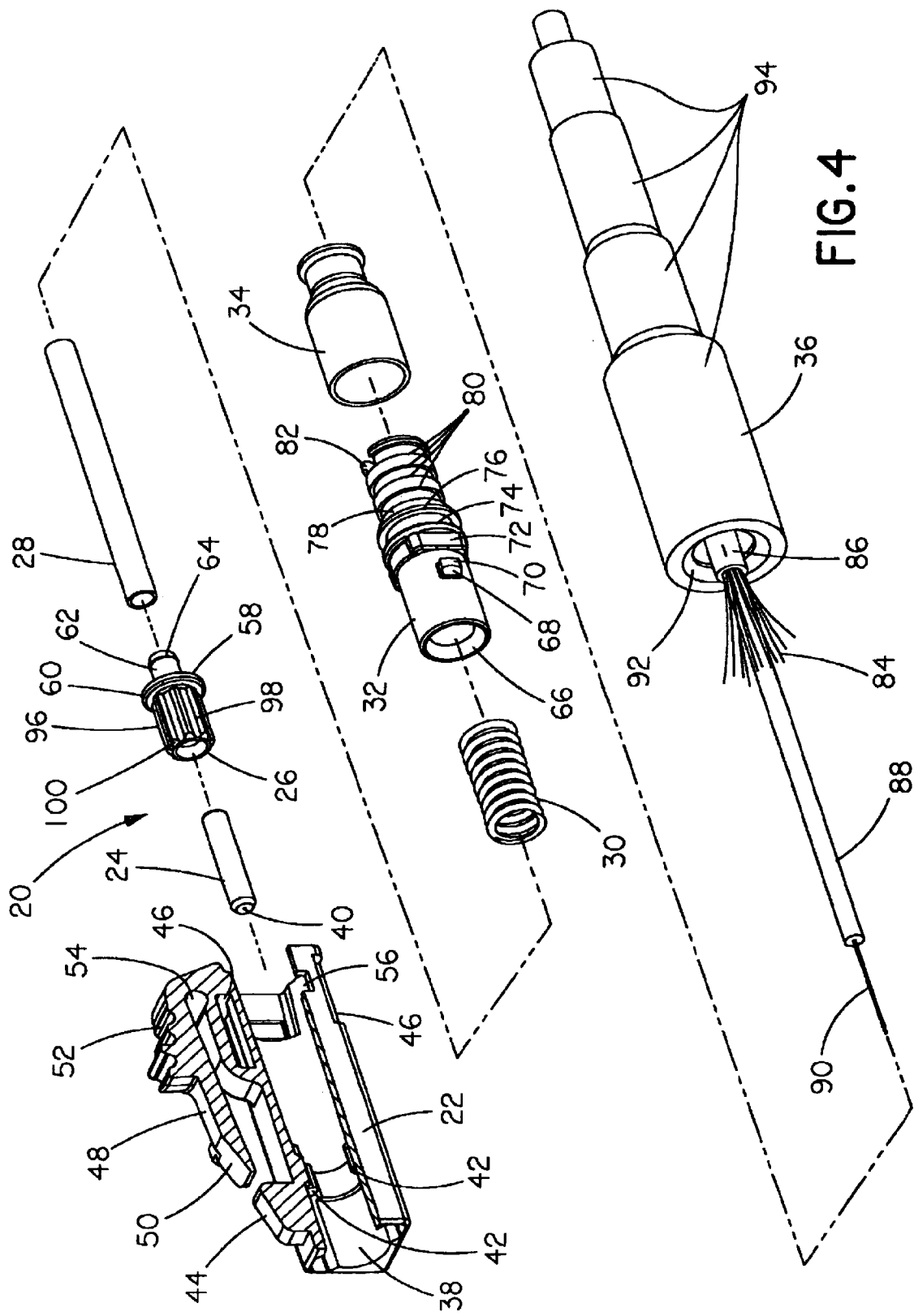
FIG. 4 is an exploded perspective view of the connector of FIG. 1.
Figure 8:
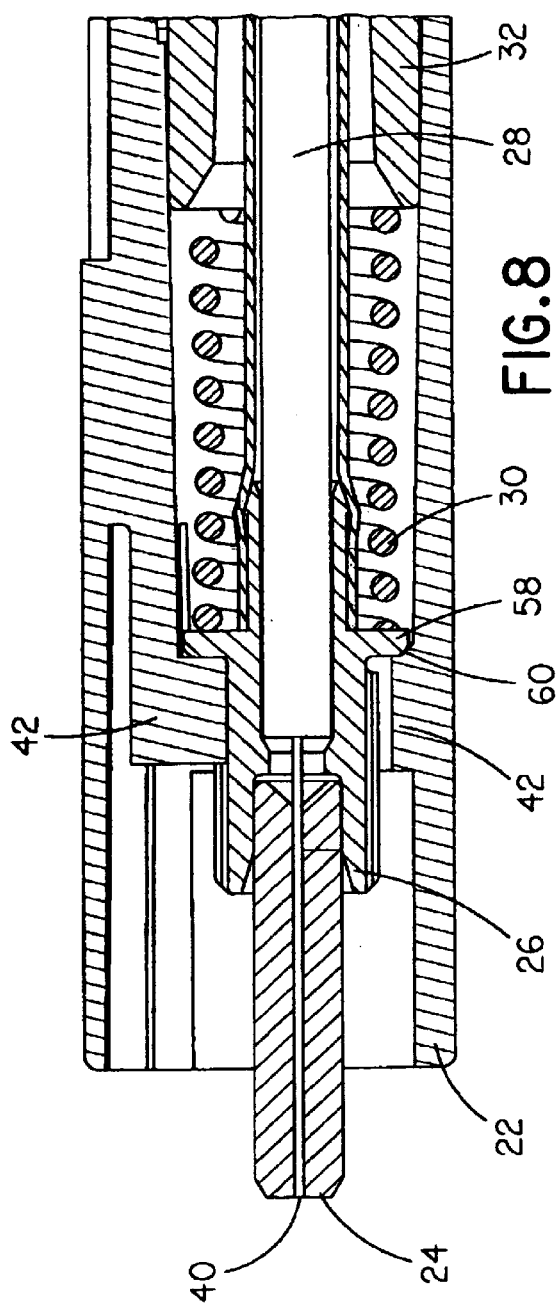
FIG. 8 is a partial cross-sectional view taken along lines 8—8 of FIG. 5.

The housing 22 includes a central bore 38 extending therethrough in which the ferrule assembly is located. As shown in FIG. 4, the ferrule assembly includes a ferrule 24 having an aperture 40 therein and a ferrule holder 26 for receiving the ferrule 24 therein. The ferrule 24 may be made of a suitably hard material such as ceramic, glass, plastic or metal. Preferably, the ferrule 24 is ceramic and is maintained in the ferrule holder 26 by interference friction. Alternatively, the ferrule 24 could be held in the ferrule holder 26 by an adhesive. As seen in FIG. 3, the housing 22 has two tuning arms, such as tuning arm 42, within the bore 38 for engaging the ferrule assembly. It is likewise contemplated that the housing 22 may have more than two tuning arms 42 within the bore 38 for engaging the ferrule assembly. For example, the housing 22 may include four tuning arms 42 spaced 90 degrees apart around the interior thereof.

As shown in FIGS. 1–4, the connector 20 has a latch guide 44 positioned at the front of the housing 22 to guide a dust cap onto the housing 22, such as the dust cap disclosed in U.S. patent application Ser. No. 60/443,694 the disclosure of which is incorporated by reference. The dust cap protects the ferrule 24 during shipping and handling, and the latch guide 44 protects the lead-in 50 of the latch 48 when the connector 20 is mated into an adapter. As further shown in FIGS. 1–4, the housing 22 has two attachment slots 46 that allow the simplex connector 20 to be duplexed in the factory or field, utilizing a duplex clip such as the one disclosed in U.S. patent application Ser. No. 60/443,742 the disclosure of which is incorporated by reference.

As shown in FIGS. 1–4, the connector 20 has a latch 48 for mating the connector 20 into an adapter, and the latch 48 has a lead-in 50 that deflects the latch 48 down during the connector 20 mating into the adapter. Moreover, the latch 48 has grips 52 for depressing the latch 48 and easing removal of the connector 20 from the adapter, while the latch radii 54 reduce the amount of stress on the latch 48 when depressed. As best shown in FIGS. 1 and 2, the housing 22 also has a window 56 for mating with the backbone latch 70 to lock the backbone 32 into the housing 22, which controls the amount of pre-load on the spring 30 and the ferrule assembly. Preferably, the backbone 32 is plastic.

The ferrule holder 26 has a flange 58 including a chamfer 60 for facilitating assembly of the ferrule holder 26 into the housing 22. The flange 58 and chamfer 60 also center the ferrule 24 within the housing 22 automatically prior to mating the connector 20 into an adapter. As best seen in FIG. 4, the ferrule holder 26 also has a tube 62 including a barb 64 extending from a rear surface thereof. Upon full assembly of the connector 20, the barb 64 engages the adhesive tube 28 and secures the adhesive tube 28 to the ferrule holder 26. The adhesive tube 28 guides the prepared fiber into the ferrule assembly and the needle of the adhesive syringe to the back of the ferrule 24. When the connector 20 is assembled, the spring 30 surrounds the tube 62 of the ferrule assembly with one end bearing against the rear surface of the flange 58 and the other end bearing against an internal shoulder in the backbone 32. The spring 30 maintains a spring force when the assembled connector 20 is mated with another connector inside an adapter.

As best seen in FIGS. 3 and 4, the backbone 32 has a chamfer 66 for facilitating the assembly of the backbone 32 over the adhesive tube 28. The backbone 32 also has a latch lead-in 68 that facilitates the assembly of the backbone 32 into the housing 22, as best seen in FIG. 1. Moreover, a curve latch 70 localizes and reduces the stress on the rear of the housing 22 when inserting the backbone 32 into the housing 22.

As best seen in FIG. 3, the backbone 32 includes a collar 72 and a stop flange 74. The collar 72 reduces the amount of clearance and movement to the opening in the back of the housing 22, and the stop flange 74 keeps the backbone 32 from being inserted too deep in the housing 22. The backbone 32 also includes a boot latch face 76, which engages the boot latch 78 and secures the boot 36 onto the backbone 32.

As shown in FIG. 3, the backbone 32 further includes four crimp grooves, such as crimp groove 80, and two keying slots, such as keying slot 82. The keying slots 82 fix the orientation of the backbone 32 during the connector 20 assembly process. As best seen in FIG. 6, the crimp grooves 80 create surfaces to capture the Kevlar® 84 when the crimp sleeve 34 is compressed onto the backbone 32. When compressed, the Kevlar® 84 is locked between the crimp sleeve 34 and backbone 32 to secure the cable therein. As best seen in FIG. 6, heat shrink tube 85 is assembled onto the rear surface of the crimp sleeve 34. The heat shrinking process holds jacket 86 and clamps the heat shrink tube 85 to the jacket 86.

In the field, prior to insertion into the connector 20, a field fiber is prepared by appropriately stripping the insulative layer(s) and any stiffening layer(s) off the end of the field fiber. As can be seen in FIG. 4, the layers include jacket 86, made of insulative rubber or plastic, and buffer 88, made of insulative rubber or plastic. An intermediate strengthening layer, such as Kevlar® 84, circumferentially resides between the buffer 88 and the jacket 86. A portion of the jacket 86 and a portion of the buffer 88 are stripped off.

As best seen in FIG. 4, the boot 36 has a chamfer 92 for facilitating assembly of the boot 36 onto the backbone 32. The boot 36 also has three segmented sections, such as segmented section 94, with varying wall thicknesses which cause the boot 36 to flex differently at each segment. The rear end of the boot 36 is the thinnest section and flexes easily when a low load is applied. Each segmented section 94 gets thicker as the boot 36 approaches the connector 20 and, thus, increases the force required to flex the boot 36. The boot 36 also has a latch 78 that locks over the latch face 76 and secures the boot 36 to the backbone 32, as shown in FIG. 6.

Figure 10:
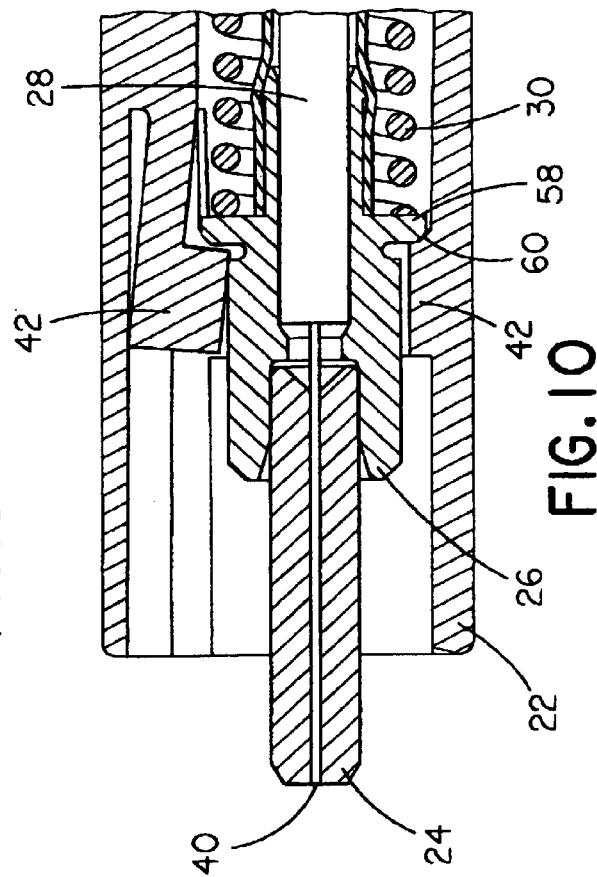
FIG. 10 is a partial cross-sectional view taken along lines 10—10 of FIG. 9.
Figure 9:
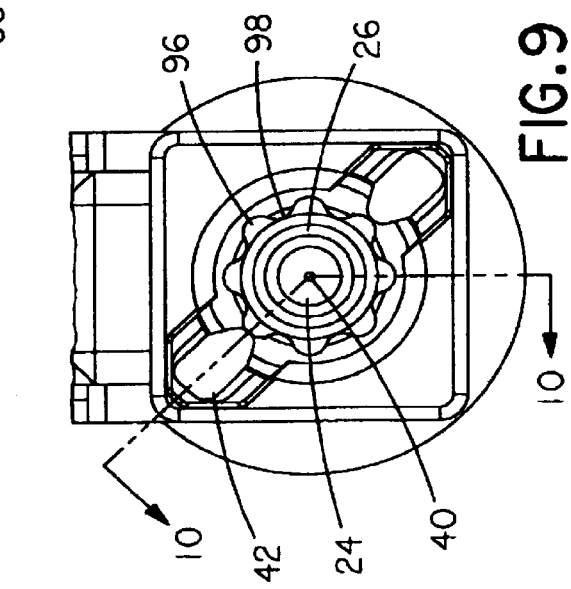
FIG. 9 is an end view of the connector of FIG. 1, during rotation of the ferrule holder.

FIGS. 5–10 illustrate the connector 20 prior to and during the tuning process. Specifically, FIGS. 5–8 show the connector 20 prior to tuning, and FIGS. 9 and 10 show the connector 20 during the tuning process. The tuning arms 42 allow the ferrule assembly to be tuned inside the housing 22 without disengaging the ferrule assembly from the tuning arms 42. As shown in FIGS. 9 and 10, the tuning arms 42 are designed to detent out of the way so that the ferrule assembly can be rotated to the optimal alignment position with another connector, inside a tuning tool, and automatically detent back to lock in the orientation, utilizing the tuning tool disclosed in U.S. patent application Ser. No. 10/354,388 the disclosure of which is incorporated by reference.

As best seen in FIGS. 5, 7 and 9, the ferrule holder 26 has eight splines 96 spaced 45 degrees apart around the periphery of the front surface thereof. Likewise, the ferrule holder 26 has eight grooves 98 spaced 45 degrees apart around the periphery of the front surface thereof. The splines 96 and grooves 98 are positioned in an alternate arrangement around the periphery of the front surface of the ferrule holder 26. The tuning arms 42 move from one groove (FIG. 7) to a spline (FIG. 9) and back to another groove (FIG. 7) spaced 45 degrees apart, as the ferrule holder 26 is tuned within the housing 22. The ferrule assembly can be rotated at 45 degree increments until the optimal alignment position with another connector is located. Preferably, and as shown in FIG. 3, each spline has a chamfer 100 for facilitating insertion of the ferrule assembly into the housing 22.

The disclosed invention provides a tunable fiber optic connector. The connector includes a housing having two tuning arms within the bore for engaging the ferrule assembly. The tuning arms allow the ferrule assembly to be tuned inside the housing without disengaging the ferrule assembly from the tuning arms. It should be noted that the above-described and illustrated embodiments and preferred embodiments of the invention are not an exhaustive listing of the forms such a tunable fiber optic connector in accordance with the invention might take; rather, they serve as exemplary and illustrative of embodiments of the invention as presently understood. By way of example, and without limitation, a tunable fiber optic connector having a housing that has four tuning arms is contemplated to be within the scope of the invention. Many other forms of the invention are believed to exist.

What is claimed is:

1. A tunable fiber optic connector comprising:
    a ferrule assembly comprising
       a ferrule; and
       a ferrule holder for receiving the ferrule therein, the ferrule holder having a plurality of splines on the periphery of a front surface thereof;
    a housing having a central bore extending therethrough in which the ferrule assembly is located; and
    a spring bearing against a rear surface of the ferrule holder for applying a forward biasing force to the ferrule assembly,
    wherein the housing has at least one tuning arm within the bore for engaging the ferrule assembly, the tuning arm allows the ferrule assembly to be tuned inside the housing without disengaging the ferrule assembly from the tuning arm.

2. The connector of claim 1 wherein the ferrule holder has eight splines spaced 45 degrees apart around the periphery of the front surface thereof, wherein one of the splines engages the tuning arm during rotation of the ferrule assembly.

3. The connector of claim 2 wherein each spline has a chamfer for facilitating insertion of the ferrule assembly into the housing.

4. The connector of claim 1 wherein the ferrule holder has eight grooves spaced 45 degrees apart around the periphery of the front surface thereof, wherein one of the grooves mates with the tuning arm when the ferrule assembly is in a tuned position.

5. The connector of claim 1 wherein the ferrule holder has a chamfer for facilitating assembly of the ferrule into the ferrule holder.

6. The connector of claim 1 wherein the ferrule holder has a flange including a chamfer for facilitating assembly of the ferrule holder into the housing, wherein the flange and the chamfer center the ferrule in the housing automatically.

7. The connector of claim 1 wherein the ferrule holder has a tube including a barb extending from a rear surface thereof, the barb engaging an adhesive tube and securing the adhesive tube to the ferrule holder.

8. The connector of claim 1 wherein the housing has two tuning arms within the bore for engaging the ferrule assembly.

9. The connector of claim 1 wherein the housing has a latch including a lead-in for deflecting the latch while mating the connector into an adapter.

10. The connector of claim 9 wherein the latch has grips for depressing the latch and facilitating removal of the connector from the adapter.

11. The connector of claim 9 wherein the housing has a latch guide for guiding a dust cap onto the housing, the latch guide protects the lead-in while mating the connector into the adapter.

12. The connector of claim 1 wherein the housing has two attachment slots for allowing the connector to be duplexed.

13. The connector of claim 1 wherein the housing has a window for mating with a latch to lock a backbone into the housing.

14. The connector of claim 1 wherein the connector is an LC type connector.

15. A method of assembling a tunable fiber optic connector comprising the steps of:
    providing a ferrule extending from a ferrule holder, the ferrule holder retainably engaging the ferrule, wherein the ferrule holder has a plurality of splines on the periphery of a front surface thereof;
    positioning a spring against a rear surface of the ferrule holder for applying a forward biasing force to the ferrule holder;
    positioning the ferrule holder within a bore of a housing, the housing having at least one tuning arm within the bore for engaging the ferrule holder; and
    rotating the ferrule holder between selectable discrete positions within the housing without disengaging the ferrule holder from the tuning arm.

16. The method of claim 15 wherein the housing has two tuning arms within the bore for engaging the ferrule holder.

17. The method of claim 15 wherein the connector is an LC type connector.

* * * * *